J. H. BAILEY & L. LOUPEE.
WEANING BITS FOR CALVES.
No. 175,640. Patented April 4, 1876.
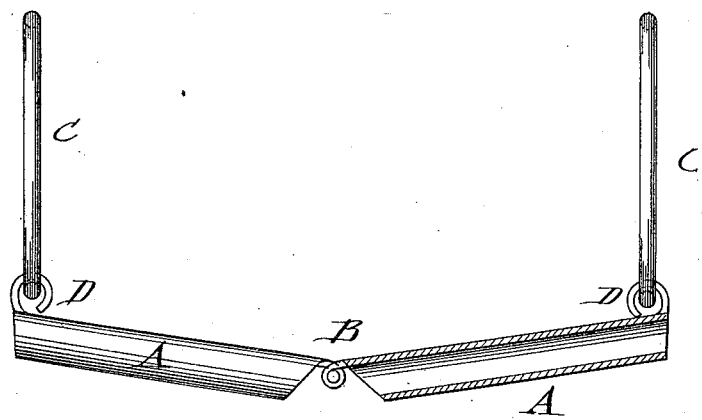

UNITED STATES PATENT OFFICE.

JOHN H. BAILEY AND LEWIS LOUPEE, OF TOLEDO, IOWA.

IMPROVEMENT IN WEANING-BITS FOR CALVES.

Specification forming part of Letters Patent No. 175,640, dated April 4, 1876; application filed March 13, 1876.

*To all whom it may concern:*

Be it known that we, JOHN H. BAILEY and LEWIS LOUPEE, of Toledo, in the county of Tama and State of Iowa, have invented a new and Improved Anti-Sucking Bit for Calves, of which the following is a specification:

The accompanying drawing represents a sectional top view of our improved anti-sucking bit for calves.

The invention relates to an improvement in the anti-sucking bits for calves for which Letters Patent have been granted to John H. Bailey, under date of November 9, 1875, No. 169,670, so that the animal has a better chance to eat and drink without covering up the ends; and the invention consists of a tubular suction-bit, which is made of two centrally-hinged sections, open at the ends, which rings are attached to stationary staples projecting toward the rear of the bit-sections.

In the drawing, A represents the tubular sections of our improved anti-suction bit for calves, which are open at the outer and inner ends, and connected by a hinge, B, at the inner ends, that are cut at suitable angle of inclination toward the hinge. The hinge connection of the bit-sections gives greater play to the same, so as to render the eating and drinking easier to the animal, while still preventing the sucking, and, by the ingress and egress of air, the clogging of the sections. The rings C, by which the bit is attached to the head of the calf, are attached to fixed staples or eyes D at the outer ends of the bit-sections, the eyes projecting at the rear part, and preventing, in connection with the rings, the closing of the end openings of the bit by the mouth of the animal. The air is thereby always admitted through the ends of the bit, the calf not being hindered in eating and drinking, but fully prevented from sucking.

Having thus described our invention, we claim as new and desire to secure by Letters Patent—

1. A suction-bit made of centrally-hinged tubular sections, with open ends, the inner ends being inclined toward the hinge, substantially as and for the purpose set forth.

2. A tubular suction-bit made of hinged sections, having at the outer ends fixed staples or eyes, extending to the rear for attaching the strap-rings, to prevent closing of outer open ends, substantially as set forth.

JOHN H. BAILEY.
LEWIS LOUPEE.

Witnesses:
   P. G. WIETING,
   W. A. FREER.